United States Patent
Beshai et al.

(10) Patent No.: US 6,882,799 B1
(45) Date of Patent: Apr. 19, 2005

(54) MULTI-GRAINED NETWORK

(75) Inventors: Maged E. Beshai, Stittsville (CA); Richard Vickers, Kanata (CA)

(73) Assignee: Nortel Networks Limited (CA)

( * ) Notice: Subject to any disclaimer, the term of this patent is extended or adjusted under 35 U.S.C. 154(b) by 658 days.

(21) Appl. No.: 09/671,140

(22) Filed: Sep. 28, 2000

(51) Int. Cl.$^7$ .......................... H04J 14/00; G02B 6/35; H04B 10/20

(52) U.S. Cl. ........................ 398/45; 398/47; 398/50; 398/54; 398/56; 398/116; 398/164

(58) Field of Search .................. 398/74, 45, 56, 398/57, 66, 130, 165, FOR 119, 47, 49–51, 54, 116; 370/352, 401, 388, 360; 385/24, 16

(56) References Cited

U.S. PATENT DOCUMENTS

| | | | | |
|---|---|---|---|---|
| 5,005,166 A | * | 4/1991 | Suzuki et al. .................. | 398/47 |
| 5,127,000 A | | 6/1992 | Henrion ........................ | 370/60 |
| 5,172,259 A | * | 12/1992 | Cloonan et al. ............... | 398/58 |
| 5,589,967 A | * | 12/1996 | Auffret ......................... | 398/54 |
| 5,703,707 A | * | 12/1997 | Dieudonne et al. ........... | 398/50 |
| 5,724,351 A | * | 3/1998 | Chao et al. ............. | 370/395.42 |
| 5,777,761 A | * | 7/1998 | Fee ............................... | 398/7 |
| 5,790,287 A | * | 8/1998 | Darcie et al. ................. | 398/108 |
| 5,864,414 A | * | 1/1999 | Barnsley et al. .............. | 398/71 |
| 6,005,994 A | * | 12/1999 | MacDonald et al. .......... | 385/16 |
| 6,170,996 B1 | * | 1/2001 | Miura et al. .................. | 385/94 |
| 6,356,546 B1 | * | 3/2002 | Beshai ........................ | 370/358 |
| 6,362,908 B1 | * | 3/2002 | Kimbrough et al. ........ | 398/164 |
| 6,470,112 B1 | * | 10/2002 | Okayama ..................... | 385/24 |
| 6,490,252 B1 | * | 12/2002 | Riggan et al. ............... | 370/237 |
| 6,493,350 B1 | * | 12/2002 | Hojo et al. .................. | 370/420 |
| 6,493,481 B1 | * | 12/2002 | Okayama et al. ............. | 385/17 |
| 6,532,090 B1 | * | 3/2003 | Doerr et al. .................. | 398/48 |
| 6,542,599 B1 | * | 4/2003 | Miyagawa ............. | 379/221.03 |
| 6,549,314 B1 | * | 4/2003 | Yamaguchi .................. | 398/68 |
| 6,571,030 B1 | * | 5/2003 | Ramaswami et al. ......... | 385/17 |

FOREIGN PATENT DOCUMENTS

| | | | |
|---|---|---|---|
| GB | 2254529 A | 10/1992 | ........... H04L/12/56 |
| WO | WO 99 03237 | 1/1999 | ........... H04L/12/56 |

OTHER PUBLICATIONS

Obra H. et al: "Input and Output Queueing ATM Switch Architecture with Spatial and Temporal Slot Reservation Control", Electronic Letters vol. 28, No. 1, Jan. 1, 1992.

* cited by examiner

Primary Examiner—Leslie Pascal
(74) Attorney, Agent, or Firm—Steubing McGuinness & Manaras LLP

(57) ABSTRACT

A multi-grained network includes edge modules that switch high-variance multi-rate data traffic, and independent core modules that switch paths having different granularities. The core may include core modules that switch fixed-size data blocks, core modules that switch channels or bands of channels, core modules that switch entire links, and core modules that cross-connect channels or links. To simplify the control functions, the core modules operate independently from each other. Direct link, band or channel connections may be established for selected ingress-egress edge module pairs, if traffic volumes warrant. The use of graded granularity in the core simplifies the control function and reduces network cost.

16 Claims, 12 Drawing Sheets

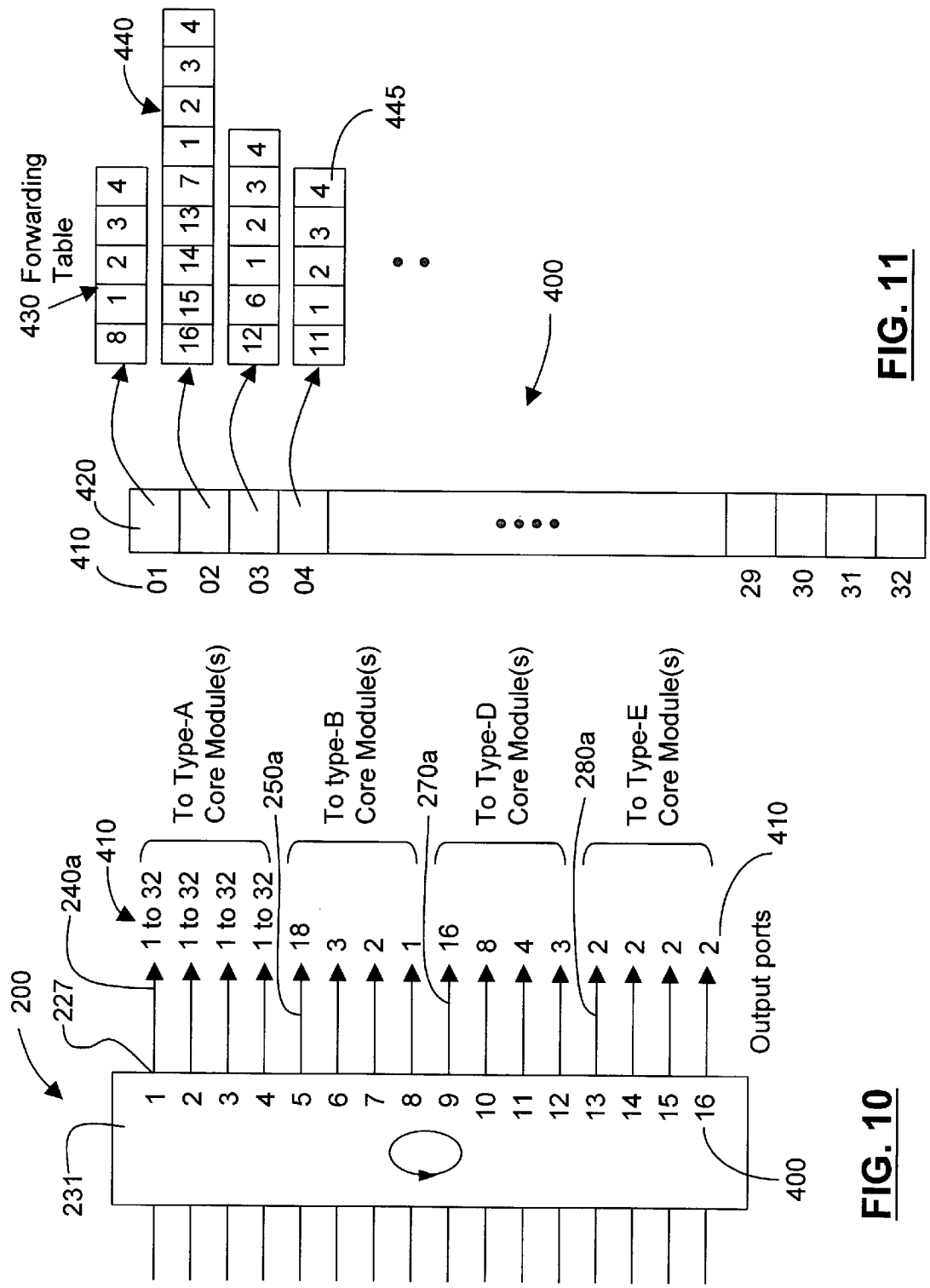

MULTI-GRAINED NETWORK

CROSS-REFERENCE TO RELATED APPLICATIONS

This is the first application filed for the present invention.

MICROFICHE APPENDIX

Not applicable.

TECHNICAL FIELD

This invention relates generally to the field of data network design and control. In particular, it relates to the design of a network that provides paths of different granularities between edge modules, and to routing control in the network.

BACKGROUND OF THE INVENTION

Data networks are generally constructed using a number of edge switches, also referred to as "edge modules", that are connected to local data sources and data sinks. The edge modules are interconnected by a network core that switches traffic between edge modules, as required. The network core may be a distributed core that includes a plurality of geographically distributed core modules. The network core may also be an agile core that is reconfigured to satisfy fluctuating traffic demands.

Links interconnecting the edge modules and the core modules support communications paths for transferring data between edge modules. Each of the communications paths has a predetermined granularity defined as an integer multiple of a capacity unit. A capacity unit is the minimum capacity, in bits per second, that may be assigned to a traffic stream. Traditionally, the granularity of links interconnecting edge modules with core modules is uniform. Several examples of architectures for modern data networks with links of uniform granularity are described in Applicant's copending United States patent applications referenced below.

In Applicant's copending U.S. patent application Ser. No. 09/286,431, filed on Apr. 6, 1999, and entitled SELF-CONFIGURING DISTRIBUTED SWITCH, a network architecture is described in which high-capacity electronic edge modules are interconnected by an agile channel-switching optical core. A global controller selects paths through the channel switched core and reconfigures the paths in response to dynamic changes in data traffic loads. Reconfiguration timing between the edge modules and the channel switch core modules is performed to keep reconfiguration guard time minimized.

In Applicant's copending U.S. patent application Ser. No. 09/475,139, filed on Dec. 30, 1999, and entitled AGILE OPTICAL-CORE DISTRIBUTED PACKET SWITCH, an architecture for an optical-core network in which a core module controller selects paths through an associated core module and reconfigures the paths in response to dynamic changes in data traffic loads is described. Switching latency in the core modules is masked so that the source edge modules need not disrupt data transmission during core reconfigurations. A slight surplus capacity is provided in the core modules to facilitate core reconfigurations. The reconfiguration functions of the edge modules and the core modules are coordinated to keep reconfiguration guard time minimized. This yields a high capacity, load-adaptive, self-configuring switch that can be widely distributed to serve a large geographical area.

In Applicant's copending U.S. patent application Ser. No. 09/550,489, filed Apr. 17, 2000, and entitled HIGH CAPACITY WDM-TDM PACKET SWITCH, a network architecture is described in which electronic edge modules are interconnected by space switches that are operated in a time division multiplexed (TDM) mode. The use of TDM permits a channel (typically a wavelength in a WDM transport medium) to be split into several sub-channels. This increases the number of edge modules that can be directly reached without a requirement for tandem switching. The network comprises a distributed channel switching core, the core modules being respectively connected by a plurality of channels to a plurality of high-capacity packet switch edge modules. Each core module operates independently to schedule paths between edge modules, and reconfigures the paths in response to dynamic changes in data traffic loads reported by the edge modules. Reconfiguration timing between the packet switch edge modules and the channel switch core modules is performed to keep reconfiguration guard time minimized.

In Applicant's copending U.S. patent application Ser. No. 09/624,079, filed Jul. 24, 2000, and entitled MULTI-DIMENSIONAL LATTICE NETWORK, a multirtel dimensional lattice network that scales to capacities of the order of a Yotta b/s (1024 bits per second) includes a plurality of sub-nets of edge module switches interconnected by an agile switching core. A sub-net may be constructed as an agile optical-core network as described in patent applications referenced above, or as an agile electronic-based core, as described in U.S. patent application Ser. No. 09/550,489 referenced above.

Each of the above-described network architectures was designed around network links that support paths of a uniform granularity. It is well known that the elasticity and granularity of a path can have a considerable impact on a network's efficiency and control complexity. It is also well known that coarse paths (paths in which the capacity unit is very large, e.g., 10 Gb/s) reduce the number of control variables and thus simplify network control functions. However, if traffic volume does not warrant coarse path granularity, the use of coarse paths may dramatically reduce network efficiency. On the other hand, paths having a fine granularity (paths in which the capacity unit is relatively small, e.g., 100 Kb/s) tend to increase network efficiency since more direct paths can be established from each edge module to other edge modules in the network. This reduces the mean number of hops between edge modules. However, control complexity is increased, especially if the core modules are agile core modules, as described in Applicant's copending patent applications referenced above.

It is generally believed that the diversity of data traffic in modern data networks is increasing. Transfer rate requirements in networks with diverse traffic loads may vary from a few Kb/s to a few Gb/s, or even up to a Tb/s. In addition, data traffic patterns typically show that the bulk of data traffic originating from any edge switch is often directed to only a few other edge switches, the balance of the data traffic being widely distributed to a very large number of other edge switches. While existing networks can be configured to service such distributions of data traffic, they are not adapted to provide such service efficiently. Consequently, there is a need for a "multigrained" network that is capable of economically handling extremes in transfer rate and distribution of traffic without unmanageable control complexity.

SUMMARY OF THE INVENTION

It is therefore an object of the invention to provide an architecture for a data network that promotes high network efficiency and control simplicity by providing parallel routes of different granularity and elasticity.

It is a further object of the invention to provide a multi-grained network in which core modules support paths of different granularity and switches those paths at different rates.

The invention therefore provides a multi-grained data network, comprising a plurality of edge modules respectively connected to data sources and data sinks, and a plurality of different types of core modules, each core module being adapted to enable paths between the plurality of edge modules, a granularity of each path being specific to the type of core module that enabled the path. A plurality of data links interconnect the edge modules and the core modules.

In accordance with an embodiment of the invention, the different types of core modules respectively comprise a plurality of core modules of the same type. In accordance with a further embodiment of the invention, the core modules are geographically distributed. Preferably, the core modules operate independently without communication with each other.

In accordance with one embodiment of the invention, one of the types of core modules is an optical cross-connector adapted to enable provisioned paths between edge modules, each path having a granularity of an entire optical fiber. In accordance with another embodiment of the invention, one of the types of core modules is an optical cross-connector adapted to enable provisioned paths between edge modules, each path having a granularity of at least one channel of a wavelength division multiplexed (WDM) optical fiber.

In accordance with a further embodiment of the invention, one of the types of core modules is an optical switch adapted to switch paths between edge modules, each path having a granularity of a wavelength division multiplexed (WDM) optical fiber. In accordance with yet another embodiment of the invention, one of the types of core modules is an optical switch adapted to switch paths between edge modules, each path having a granularity of at least one channel of a wavelength division multiplexed (WDM) optical fiber.

In accordance with another embodiment of the invention, one of the types of core modules is a space switch adapted to switch paths between edge modules, each path having a granularity of a data block of a predetermined size. The space switch is preferably a time division multiplexed/wavelength division multiplexed (TDM/WDM) switch. The space switch may be, for example, an electronic, rotator-type switch.

In accordance with one embodiment of the invention, the edge modules are electronic switches. Preferably, the edge modules are rotator-type electronic switches. In accordance with an embodiment of the invention, ingress edge modules having ingress ports for receiving data from the data sources include input buffers. Certain of the output ports of ingress edge modules may be connected to a wavelength division multiplexed/time division multiplexed (WDM/TDM) core module type. If so, the output ports connected to the WDM/TDM core module type are respectively equipped with time slot interchange circuits, to enable the ingress edge module to use allocated time slots more effectively.

The invention further provides a method of allocating data traffic associated with a connection request to data transfer facilities in a multi-grained network. The method comprises steps of examining the data traffic connection request to identify an egress edge module in the multi-grained network and a traffic load associated with the connection request. A list of forwarding ports associated with the egress edge module is examined using a forwarding table and a vacancy table. The forwarding ports are examined in a predetermined order. A first forwarding port having capacity available to accommodate the request is selected.

In accordance with one embodiment of the invention, the predetermined order is a descending order with respect to a granularity of a data transport facility associated with each forwarding port. Preferably, selection of a first forwarding port having capacity available to accommodate the request involves determining whether the required traffic load of the connection exceeds a first threshold. If the required traffic load exceeds the first threshold, the connection is allocated to a first forwarding port having capacity available to accommodate the connection. If the required traffic load is less than the first threshold, the available capacity of the respective forwarding ports is examined to determine whether a committed capacity of a forwarding port exceeds a second threshold. If the committed capacity of the forwarding port is less than the second threshold, the connection is allocated to the forwarding port, provided that the available capacity of the forwarding port is greater than the required traffic load. Otherwise, the connection request is rejected. In accordance with an embodiment of the invention, the first threshold is 100 megabits per second. The second threshold is, for example, 80 percent for forwarding ports associated with provisioned optical fiber transfer facilities; 85 percent for forwarding ports associated with switched optical fiber facilities; 90 percent for forwarding ports associated with provisioned optical channel facilities; 95 percent for forwarding ports associated with switched optical channel facilities; and, 100 percent for forwarding ports associated with switched data block facilities. Committed capacity of a selected forwarding port is updated when a connection request is accepted. The committee capacity is also updated each time a connection is released.

The invention therefore provides a flexible network architecture that enables the design of a network tailored to the needs of different traffic flows in a cost-effective way. The multi-grained network may be expanded to serve a very wide geographical area, while efficiently accommodating local concentrations of data traffic, without undue cost or control complexity.

BRIEF DESCRIPTION OF THE DRAWINGS

Further features and advantages of the present invention will become apparent from the following detailed description, taken in combination with the appended drawings, in which:

FIG. 10 is a schematic diagram illustrating output port assignments in the ingress edge module illustrated in FIG. 5;

FIG. 11 is a schematic diagram of a pointer array and a forwarding table used by the ingress edge module shown in FIG. 5 to select a port for forwarding data traffic into the multi-grained data network in accordance with the invention;

It will be noted that throughout the appended drawings, like features are identified by like reference numerals.

DETAILED DESCRIPTION OF THE PREFERRED EMBODIMENT

This invention relates to a multi-grained data network in which a plurality of edge modules are respectively connected to data sources and data sinks. A plurality of different types of core modules are connected to the edge modules. Each type of the core module is adapted to enable paths between the edge modules. The granularity of each path is specific to the type of core module that enables the path. This architecture permits the construction of a data network that is tailored to service data traffic in a very efficient and cost effective way by enabling paths having granularities dictated by the traffic composition.

Figure 1:
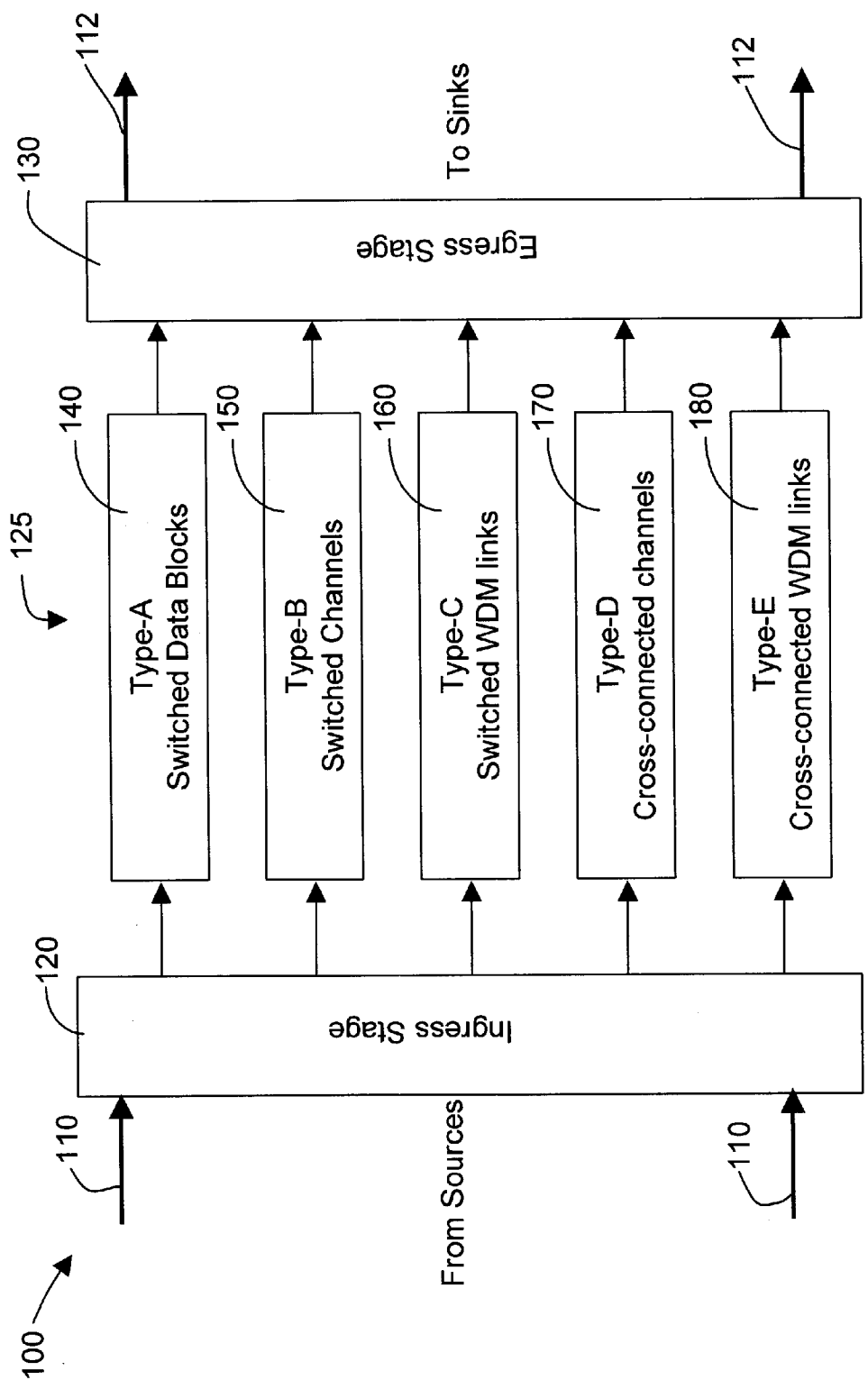
FIG. 1 is a conceptual diagram of a multi-grained data network in accordance with the invention.

FIG. 1 is a schematic diagram illustrating the basic architecture of a multi-grained data network 100 in accordance with the invention. Ingress links 110 transfer data packets from data traffic sources (not illustrated) to an ingress stage 120. The data traffic is switched through a core 125 of the network to an egress stage 130, which delivers the data traffic to egress links 112 that are connected to data traffic sinks (not illustrated). The network core 125 may enable paths of different granularities between the ingress stage 120 and the egress stage 130. As will be understood by those skilled in the art, the ingress stage 120 may be referred to as a "source stage" or an "input stage", and the egress stage 130 may be referred to as a "sink stage" or an "output stage". The ingress stage 120 is directly or indirectly connected to the data traffic sources, and the egress stage 130 is directly or indirectly connected to the data traffic sinks. The network 100 shown in FIG. 1 has an "unfolded" network architecture in which the ingress stage 120 and the egress stage 130 are separate. As is well known, ingress and egress stages are often integrated, as will be explained below with reference to FIG. 7.

In accordance with an embodiment of the invention, the network core 125 for enabling paths between the ingress stage 120 and the egress stage 130 includes one or more core switches, hereinafter referred to as core modules 140–180, for switching data traffic between the source stage 120 and the egress stage 130. Type-A core modules 140 are, for example, TDM/WDM core modules as described in Applicant's copending U.S. patent application Ser. No. 09/550,489, referenced above, the specification of which is incorporated herein by reference. The multi-grained network core 125 may also include Type-B core modules 150 for switching channel connections, or "bundled" channel connections, consisting of two or more channels switched in unison. The channels switched may be, for example, optical channels in a wavelength division multiplexed (WDM) optical fiber. The network core 125 may likewise include Type-C core modules 160 for switching entire data links, such as WDM optical fibers.

The concentration of data traffic between certain edge modules in a data network frequently warrants permanent, or substantially permanent, high-capacity paths. The multi-grained network 100 in accordance with the invention may therefore also include Type-D core modules 170 that enable provisioned paths having a granularity of a channel or a bundle of channels. The channel connections may be single channels, for example WDM optical channels, each channel typically having a capacity of about 10 Gb/s. Alternatively, the channel connections may be bundles of channels consisting of two or more WDM channels, to provide the capacity required for data traffic between two edge modules. Pairs of edge modules requiring support for significant amounts of data exchange are served by Type-E core modules 180, which preferably cross-connect entire WDM optical fibers. A WDM optical fiber that supports 32 channels, for example, enables transmission rates of about 320 Gb/s. The multi-grained data network 100 in accordance with the invention therefore enables each edge module pair to be efficiently serviced in accordance with their particular data traffic requirements.

It is noted that, hereinafter, the ports of ingress module 200 that connect to incoming links 110 are called ingress ports, the ports of ingress module 200 that connect to links 240a to 280a are called output ports, the ports of egress module 210 that connect to links 240b to 280b are called input ports, and the ports of egress module 210 that connect to outgoing links 112 are called egress ports.

Figure 2:
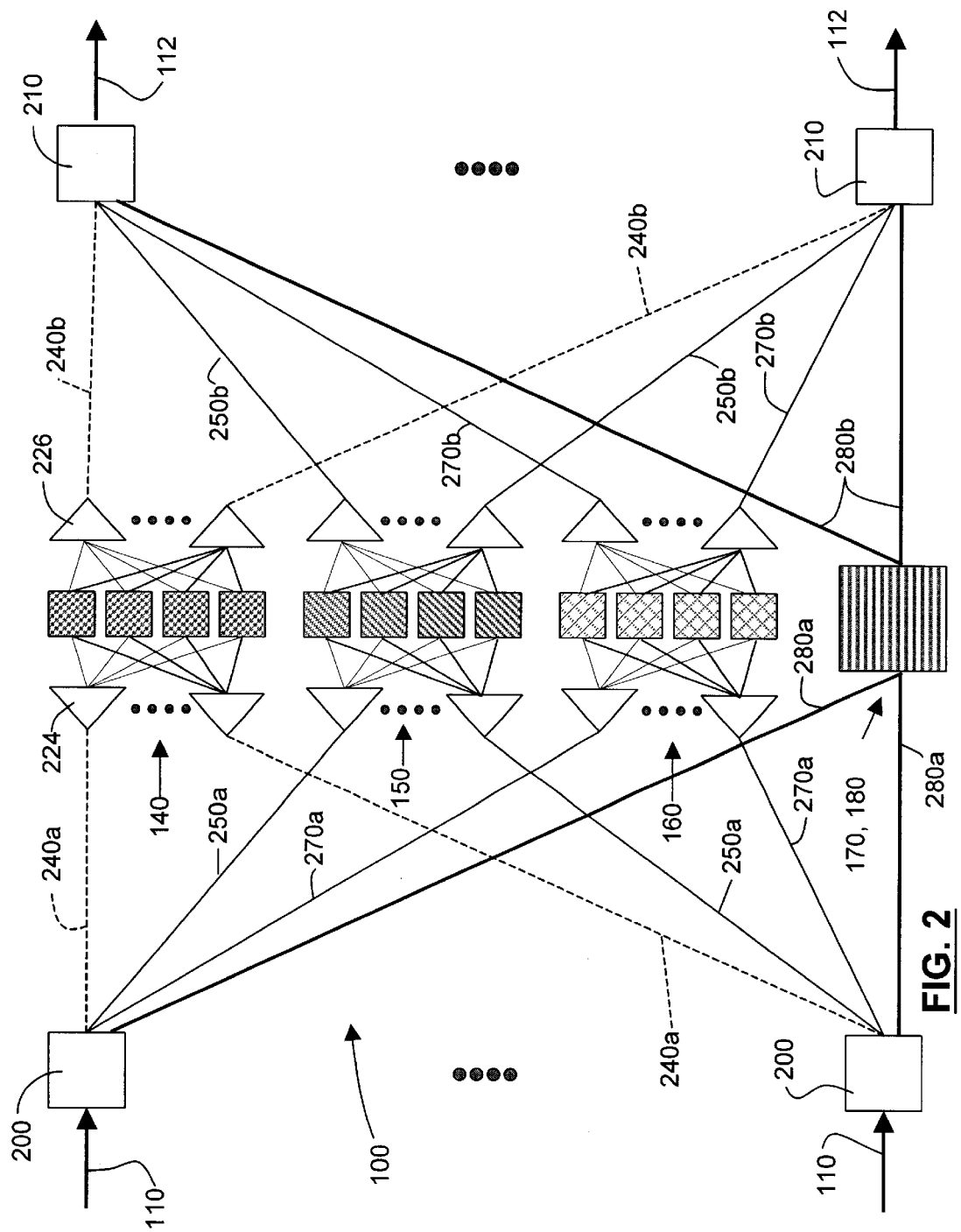
FIG. 2 is a schematic diagram illustrating an exemplary connection architecture for the multi-grained data network 100 shown in FIG. 1.

FIG. 2 is a schematic diagram illustrating an example of connectivity between elements in the multi-grained data network 100 shown in FIG. 1. A plurality of ingress modules 200 (ingress stage 120) are connected to a plurality of egress modules 210 (egress stage 130) by a plurality of core modules 140–180 which respectively enable paths of different granularities between the ingress modules 200 and the egress modules 210. The respective core modules 140–180 are connected to ingress modules 200 by data links 240a, 240b... 280a,280b. Data links 240a,240b transfer switched data blocks as described in Applicant's copending patent application Ser. No. 09/550,489, incorporated by reference above. Data links 250a,250b transfer data traffic supported by switched channel connections. Data links 260a,260b transfer data traffic supported by switched WDM fiber connections. Data links 280a,280b transfer data traffic supported by cross-connected WDM fibers.

Input links 240a–280a are preferably terminated by wavelength demultiplexers 224, which are connected to the respective core modules 140–180. Data switched by the core modules 140–180 is then multiplexed by wavelength multiplexers 226 and transferred over the output links 240b–280b to the egress modules 210. The data is then wavelength demultiplexed and switched to data traffic sinks over egress links 112 connected directly or indirectly to data traffic sinks (not illustrated).

The connection pattern shown in FIG. 2 is exemplary only, and represents only one way of configuring a multi-grained data network 100 in accordance with the invention. As will be understood by persons skilled in the art, core modules 140–180 may be geographically distributed and core modules of any given type are not necessary co-located. In fact, any group of core modules may contain any combination of different core module types, as dictated by traffic patterns, and/or other network design considerations.

Figure 3:
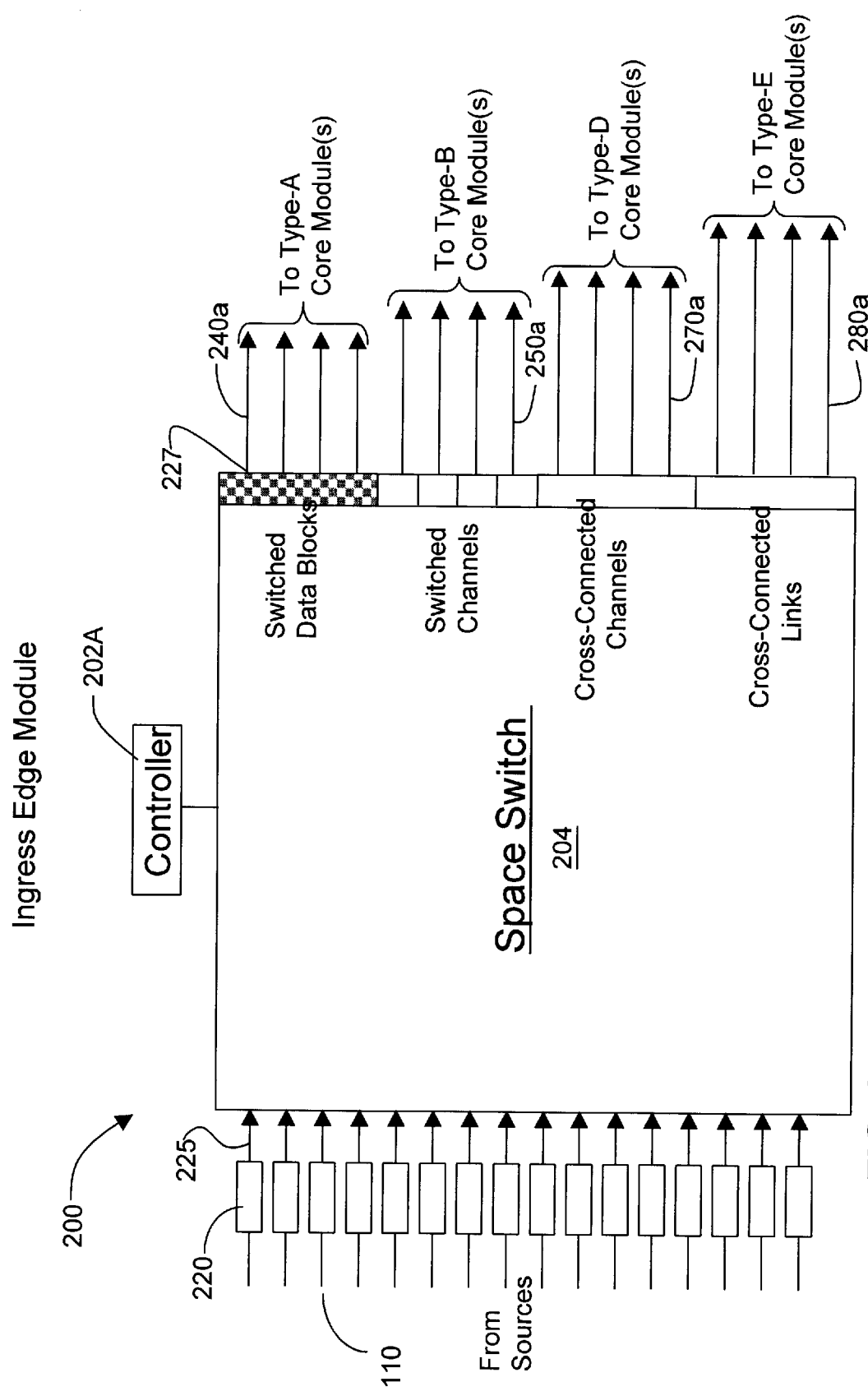
FIG. 3 is a schematic diagram of an ingress edge module configured for use in a multi-grained data network in accordance with the invention.

FIG. 3 schematically illustrates an ingress edge module 200 configured to operate in the multi-grained data network 100. The ingress module 200 includes a controller 202A. The controller 202A receives connection requests from data traffic sources (not illustrated), and services the connection requests whenever possible. Connection requests are serviced by selecting an existing path through core modules 140–180 when adequate capacity is available on the path to accommodate the connection. Otherwise, the controller 202A negotiates new paths or negotiates changes to existing paths through core modules 140–180, as required, to service fluctuations in data traffic patterns. The negotiation of new or existing paths through a self-configuring network is described in Applicant's copending patent application Ser. Nos. 09/286,431 and 09/475,139 referenced above, which are incorporated herein by reference. Input links 110 from the data traffic sources are buffered by input buffers 220, which preferably accumulate and sort data traffic into queues based on any number of criteria, as is well known in the art. Data traffic is always sorted by destination egress module 210 (FIG. 2), but may also be sorted according to other criteria such as quality-of-service (QoS), class-of-service (CoS), or the like. The output ports 227 of the space switch 204 are connected to core modules 140–180 by input links 240a–280a in a proportion preferably governed by predictions of data traffic originating from data traffic sources served by the ingress edge module 200. In the example shown, the port capacity of the ingress edge module 200 is equally distributed among core modules of Type A, B, D and E. This distribution is for purposes of illustration only. As will be explained below with reference to FIG. 5, ingress ports 225 of ingress edge module 200 divide data packets received on ingress links 110 into data segments that are transferred by the space switch 204 from the input buffers 220 to the output ports 227 of the ingress edge module 200.

Figure 4:
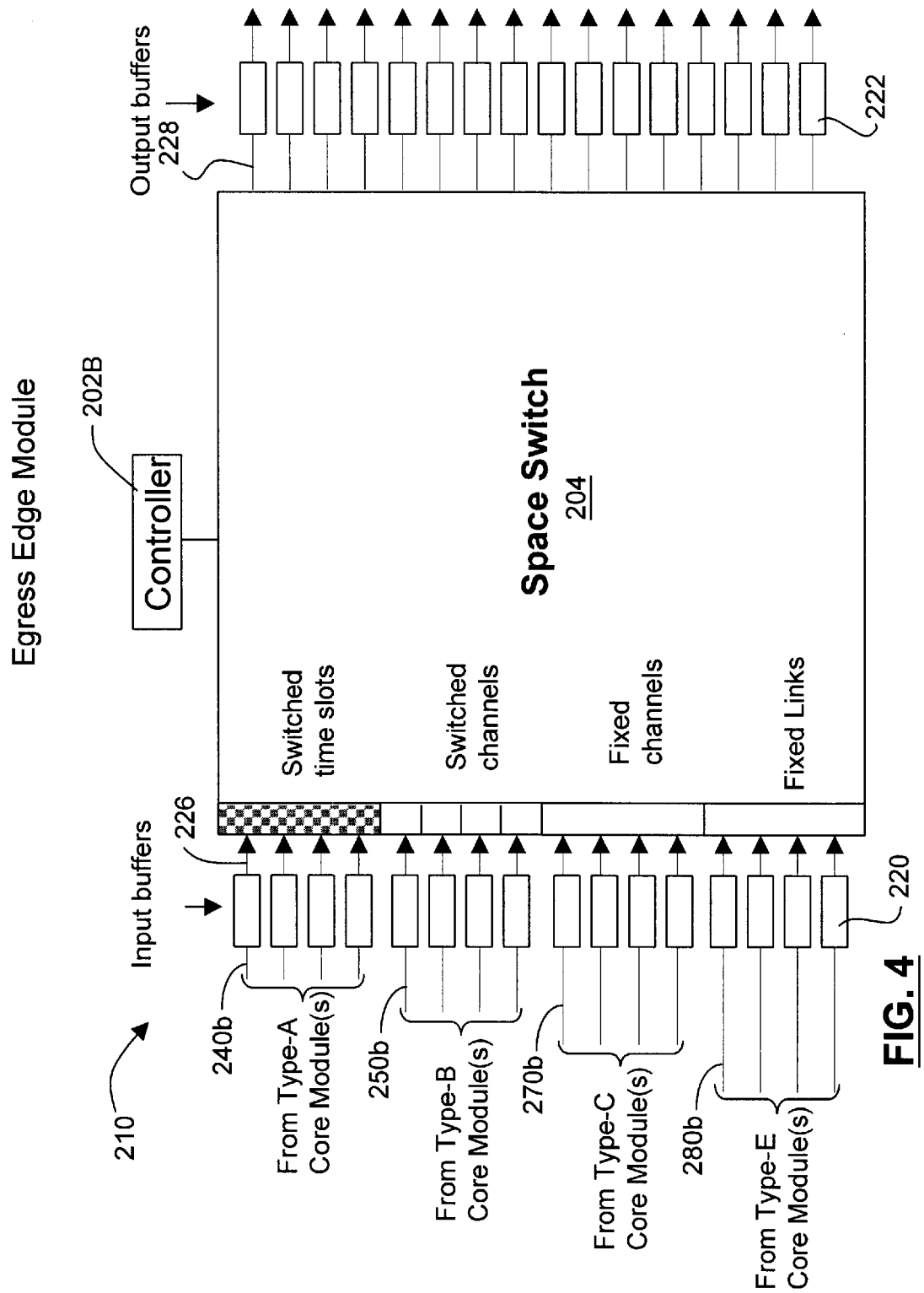
FIG. 4 is a schematic diagram of an egress edge module configured for use in a multi-grained data network in accordance with the invention.

FIG. 4 is a schematic diagram illustrating an egress edge module 210 configured for operation in a multi-grained data network 100. The egress edge module 210 includes a controller 202B, which coordinates and controls the delivery to data sinks (not illustrated) of data segments received on output links 240b–280b connected to core modules 140–180. Input buffers 220 are adapted to temporarily store data segments received on output links 240b–280b. The input buffers 220 are required due to possible contention for egress ports 228. The egress edge module 210 is preferably a space switch 204 that transfers data segments from the input buffers 220 to the egress buffers 222. Egress buffers 222 are required on the egress links to data sinks due to possible mismatch in the rate at which data sinks are adapted to receive data packet traffic. Prior to transferring data packet traffic to the data sinks, the data segments are reassembled in the egress buffers 222 so that the traffic is received at the data sink in a condition in which it was sent from the data source that originated the connection.

Figure 5:
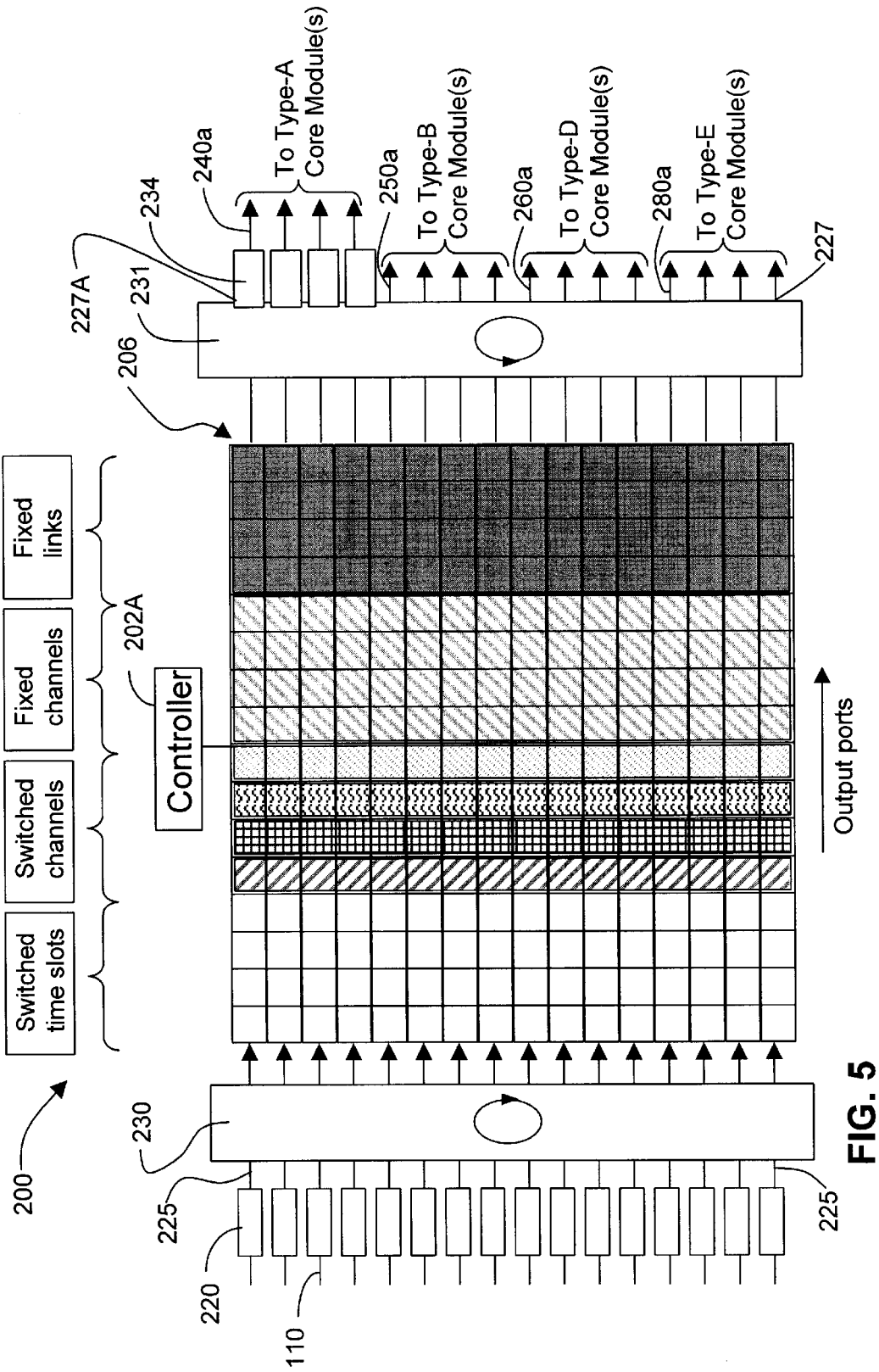
FIG. 5 is a schematic diagram of the ingress edge module shown in FIG. 3, illustrating an organization of middle memories of a rotator-type switch configured for use in a multi-grained data network in accordance with the invention.

FIG. 5 is a schematic diagram of the ingress edge module 200 shown in FIG. 3, in which the space switch 204 is a rotator-type switch described in Applicant's copending U.S. patent application Ser. No. 09/244,824, filed on Feb. 4, 1999, and entitled RATE-CONTROLLED MULTI-CLASS HIGH-CAPACITY PACKET SWITCH, the specification of which is incorporated herein by reference. The ingress edge module 200 includes a plurality of ingress links 110 that are connected to ingress buffers 220. The ingress links 110 are connected via ingress ports 225 to an ingress rotator 230 that connects the respective ingress ports 225 to shared middle memories 206 in a predetermined sequence. An output rotator 231 provides access to the shared memories 206 by output ports 227. The output ports 227 are connected to links 240a–280a that support paths of different granularities, as described above. The output ports 227 that are connected to links 240a support switched data-block connections, and are equipped with time slot interchange circuits 234, which are well known in the art. The time slot interchange circuits 234 permit the ingress edge module 200 to efficiently utilize time slots assigned by core module(s) on Type-A links 240a, as will be explained below in more detail.

As noted above, the ingress edge module 200 has a number of ingress ports 225 for receiving data traffic from subtending traffic sources. The number of ingress ports 225 is preferably about 256, or more. However, for the sake of simplicity of illustration, the switch shown in FIG. 5 is shown with only 16 ingress ports 225. Traffic received by each ingress port 225 is treated independently from the traffic received by other ingress ports 225. This applies even if the traffic source uses more than one ingress port 225 concurrently, in which case the traffic source must implement an end-to-end protocol to identify the data packets traveling by different paths, and the receiving data traffic sink must be capable of collating the data packets it receives.

The forwarding of data traffic received at the ingress ports 225 is performed under the control of the ingress edge module controller 202A (see FIG. 3) based on traffic information it receives from the ingress ports. The edge module controller 202A sorts the traffic into data traffic streams (not illustrated). Each data traffic stream may contain a plurality of individual connections associated with subtending traffic sources. In this disclosure, a data traffic stream is defined by a node pair (ingress edge module 200 and egress edge module 210), and a path supported by one of the input/output links 240–280. The data traffic from a given ingress edge module to a given egress edge module may flow through a large number of data traffic streams. The data packets associated with a data traffic stream cannot be routed through any path except the designated path associated with the data traffic stream. A path may have the capacity of an entire fiber link, if the path is routed through a Type-C or a Type-E core module 160, 180 (FIG. 1). A path may have the capacity of a single channel or a band of channels if routed through a Type-B or a Type-D core module 150, 170. A path may also have a capacity of a few Kbs to several Mb/s if routed through a Type-A core module 140.

If an entire link through a Type-C or a Type-E core module is selected, or a band of channels through a Type-B or Type-D core module is selected, data segments may arrive at an egress edge module 210 out of an order in which they were sent from the source. Nonetheless, with a relatively small number of channels per link or band, less than 120, for example, the data segments are easily re-ordered into the order in which they were sent from a source node before they are forwarded to a sink node. This requires that the data segments be labeled in a manner well known in the art. Alternatively, routing data traffic through a path that requires two or more channels may be based on assigning a connection to any single channel in the path. This limits the permissible traffic load per connection to a maximum of channel capacity, e.g., 10 Gb/s. This eliminates any requirement for reordering packets. This option is also reasonably efficient because any of the channels in a multi-channel path can be used for routing a connection.

Rotator-type switches operate by storing data for a deterministic period of time in an array of shared middle memories 206 as explained in Applicant's copending application Ser. No. 09/244,824 referenced above. The ingress ports 225 write data from ingress buffers 220 to one or more blocks in the middle memory 206 dictated by the controller 202A (FIG. 3). During each cycle of the output rotator 231, the respective output ports 227 read data segments from selected memory blocks of the shared middle memories 206 dictated by logical locations of those areas in the middle memories, 206. If an ingress module 200 is configured to operate in a multi-grained network in accordance with the invention, the middle memories are logically partitioned into areas corresponding to the respective links connected to the various types of core modules. In the example shown in FIG. 5, the shared middle memories 206 are logically partitioned into four memory-block areas of equal size, since the 16 links are equally divided into four groups of Type-A, Type-B, Type-D and Type-E. As will be readily understood by those skilled in the art, the logical organization shown in FIG. 5 does not necessarily represent a physical partitioning of the middle memories. The physical partitioning may be dynamic, and is regulated by pointers rather than physical addresses.

For a path supported by links or bands of channels, during the forwarding process at the rotator-type ingress edge module 200 shown in FIG. 5, an ingress port 225, under instruction from the controller 202A, may write its data segments to any available memory block allocated to the corresponding core facility. This reduces queue time in the ingress buffers 220 of the ingress ports 225. If a path is supported by a single channel, an ingress port 225, under instructions from the controller 202A, may forward data segments to the path during any memory access interval, but the shared middle memory blocks that may be written to is limited to memory blocks allocated to that particular channel. With respect to a time division multiplexed (TDM) path consisting of switched time slots during which a data block is transferred, an ingress port 225, under instructions from the ingress edge controller 202A, may forward data segments to the path during any memory access interval. However, the number of data segments that may be forwarded in a rotator cycle is limited by the capacity allocation to the path. For a more detailed explanation of data transfers through a rotator-type switch and a definition of "memory access interval" and rotator cycle, see Applicant's copending patent application Ser. No. 09/244,824 referenced above.

In order to facilitate the transfer of data segments to the shared middle memories 206, the access intervals of a path are not pre-assigned by the admission control processor. Instead, the allocated data segments per frame are transferred during any access interval, subject to availability of a corresponding free memory block. The time slots per path are, however, assigned by a respective Type-A core module, and in order to enable a de-coupling of the time slot allocations within the Type-A core module and the ingress edge module 200, time slot interchange circuits 234 are provided at respective output ports 227A. The time slot interchange circuits facilitate connection coordination at the edge because of this de-coupling. The time slot interchange circuits 234 accept a data block during any time slot, and forwards that data block during another time slot using a connection table that dictates the time slot position of the data block forwarded to the respective Type-A core module 140 (FIG. 2). For simplicity of operation, the cycle of the time slot interchanger is selected to equal the rotator cycle.

Figure 6:
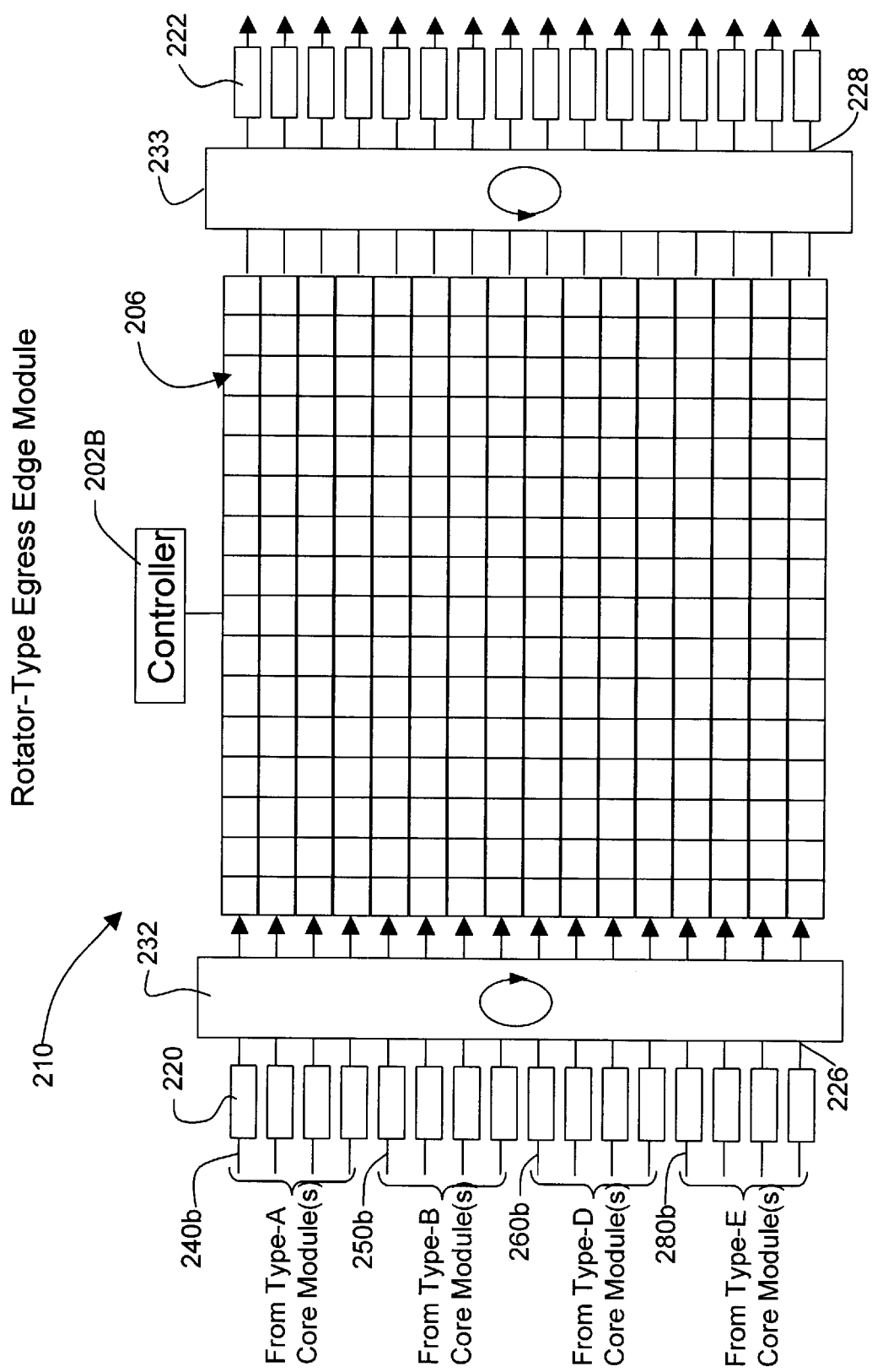
FIG. 6 is a schematic diagram of a rotator-type switch configured for use as an egress edge module in a multi-grained data network in accordance with the invention.

FIG. 6 is a schematic diagram of an egress module 210 constructed using a rotator-type electronic switch described in Applicant's copending United States patent application referenced above. The switch includes a controller 202B and a plurality of middle memories 206. Associated with the middle memories are an input rotator 232 and an egress rotator 233. Output links 240b–280b, which are connected to the core modules 140–180, terminate on input ports 226. Each input port 226 includes an input buffer 220 required for potential contention when the input ports 226 attempt to write middle memories 206. Egress ports 228 support links connected to data sinks (not shown). Each egress port 228 includes an egress buffer 222 required for transfer-rate mismatch with a data sink. It should be noted that the logical partitioning of the middle memories 206 shown in FIG. 5 is not required in egress edge module 210.

Figure 7:
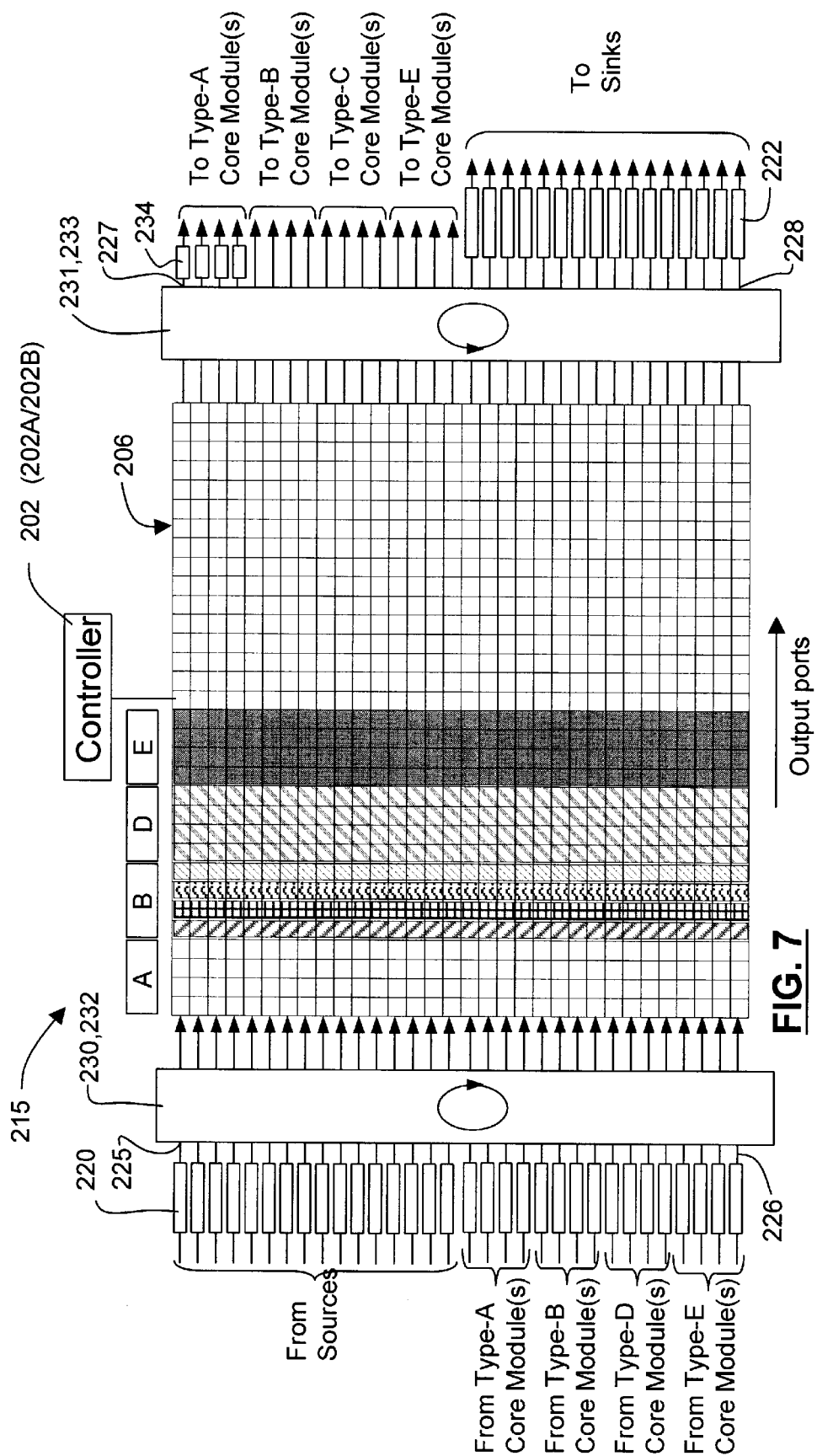
FIG. 7 is a schematic diagram of a folded rotator-type switch configured to function as an ingress/egress edge module in a multi-grained data network in accordance with the invention.

As is well known in the art, edge switches in data packet networks are often "folded" to enable direct connection between local data sources and local data sinks without using core module resources. FIG. 7 schematically illustrates a folded edge module 215 based on a rotator-type architecture. The folded edge module 215 is basically a combination of ingress edge module 200 (FIG. 5) and egress edge module 210 (FIG. 6). A plurality of the ingress ports 225 support links connected to data traffic sources, and a plurality of the input ports 226 support data links connected to the respective core modules, in this example, core modules of Type-A, Type-B, Type-D and Type-E. Each ingress port 225 includes an ingress buffer 220 required for potential delay in accessing addressed memory blocks in middle memories 206. An ingress/input rotator 230,232 connects the respective ingress ports 225 and the input ports 226 to the shared middle memories 206, as explained above.

The number of memory blocks per middle memory 206 in FIG. 7 equals the total number of ports 227 and 228. Middle memory 206 is partitioned into areas A, B, D, and E, dedicated to core modules of Type-A, Type-B, Type-D, and Type-E, respectively. The remaining part of middle memory 206 is associated with egress ports 228.

An output/egress rotator 231,233 connects output ports 227 and egress ports 228 to the middle memories in a predetermined repetitive pattern. The egress ports 228 are connected to data traffic sinks, and the output ports 227 are connected to core module Types A, B, C and E. As explained above, the egress ports 228 that support data links connected to data traffic sinks are provided with egress buffers 222. The output ports 227 connected to Type-A core modules include time slot interchange circuits 234, as also explained above.

Figure 8:
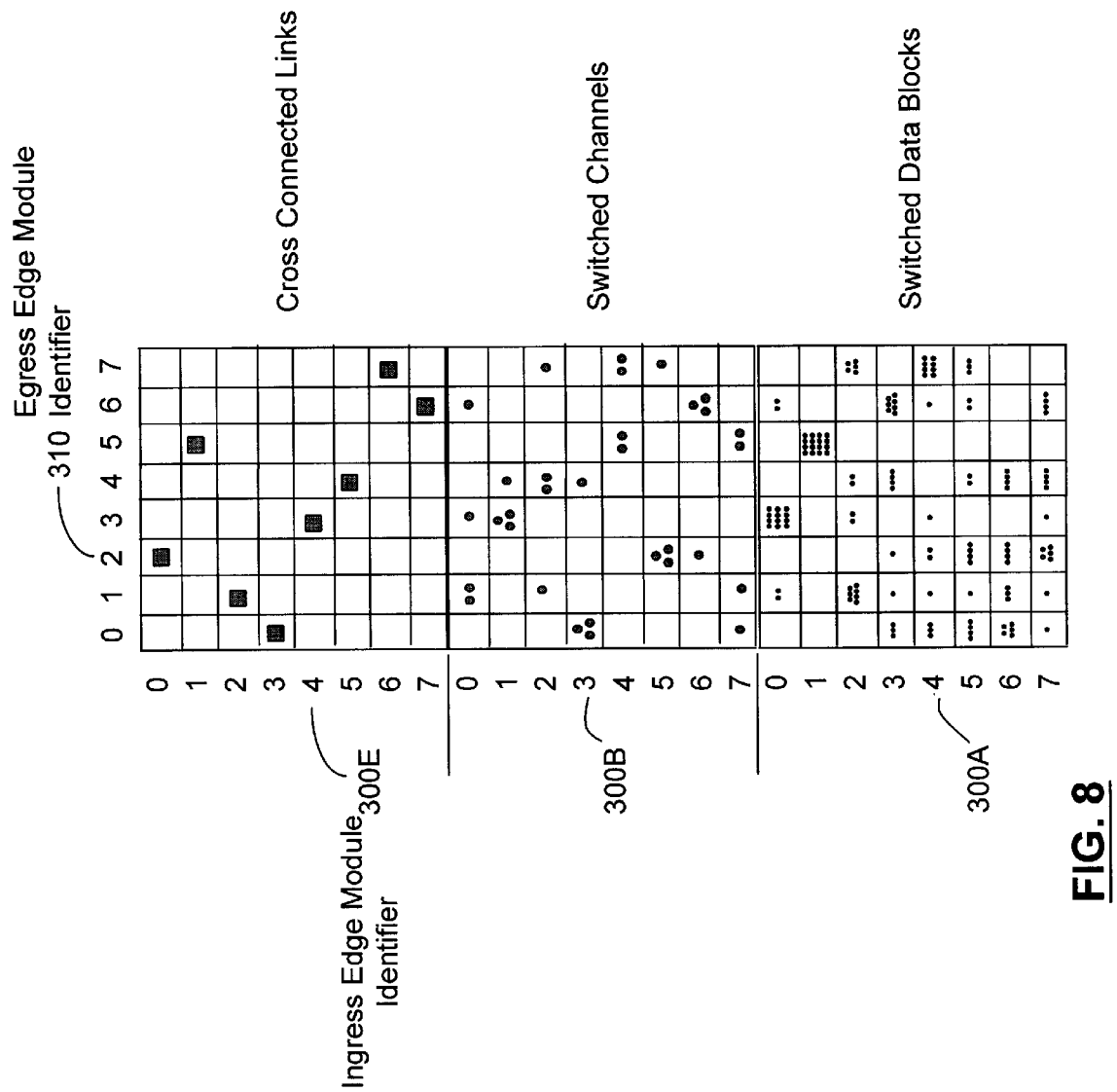
FIG. 8 is a table illustrating, at a conceptual level, connectivity between edge modules in a network in accordance with the invention that includes eight ingress and eight egress edge modules.

FIG. 8 is a table illustrating, at a conceptual level, connectivity between eight ingress edge modules 200 and eight egress edge modules 210. The respective ingress edge modules 200 are numbered 0–7 and the respective egress edge modules 210 are likewise numbered 0–7. The table is divided into three sections 300A, 300B and 300E. The respective sections illustrate connectivity between the respective ingress edge modules 200 and the egress edge modules 210 through Type-A, Type-B and Type-E core modules 140, 150 and 180 (FIG. 2). Each circular dot shown in the table at section 300A represents one time slot allocated for communications between the respective ingress/egress edge modules. For example, the ingress edge module 200 designated by identifier 0 has an allocation of two time slots for connections with egress edge module 210 designated by identifier 1; twelve time slots allocated for connections with egress edge module 210 designated by identifier 3, and two time slots allocated for connections with egress edge module 210 designated by identifier 6.

As will be understood by those skilled in the art, the section 300A of the table shown in FIG. 8 is dynamic since the switched data block connections are likely to be reconfigured on a regular basis as traffic patterns fluctuate in the network.

The larger circular dots shown in section 300B represent switched channel connections between the ingress edge modules 200 and egress edge modules 210. As shown in the table, the ingress edge module designated by identifier 0 has two switched channel connections to egress edge module designated by identifier 1; one switched channel connection to the egress module designated by identifier 3, and one switched channel connection to the egress edge module designated by identifier 6. The switched channel connections 300B support paths having a granularity of 10 GB/s, for example. The switched channel connections 300B are also dynamic and are reconfigured as required by fluctuations in traffic patterns. Since the granularity of the channel connections is considerably larger than the granularity of the switched data blocks 300A, reconfiguration of those connections is much less frequent. The squares in the cross-connected link section 300E indicate the connectivity between ingress edge modules 200 and egress edge modules 210 enabled by cross-connectors 180 (FIG. 2). Because of the granularity of paths enabled by the cross-connectors 180, a network is likely to require fewer such links than links of Types A or B. In the example illustrated, there is one cross-connected link for each of the respective edge module pairs. For example, ingress edge module 200 designated by identifier 0 is connected to the egress edge module 210 designated by identifier 2. The cross-connected links are only provided in the multi-grained data network 100 when traffic volume of edge module pairs warrants a path having a granularity of about 320 Gb/s or more, for example. Of course, if traffic volumes warrant, more than one cross-connected link can be established for any pair of edge modules. As will be understood by those skilled in the art, the cross-connected links 300 are substantially static. Although the connectivity pattern may change over time, frequent reconfigurations are not normally expected.

Figure 9:
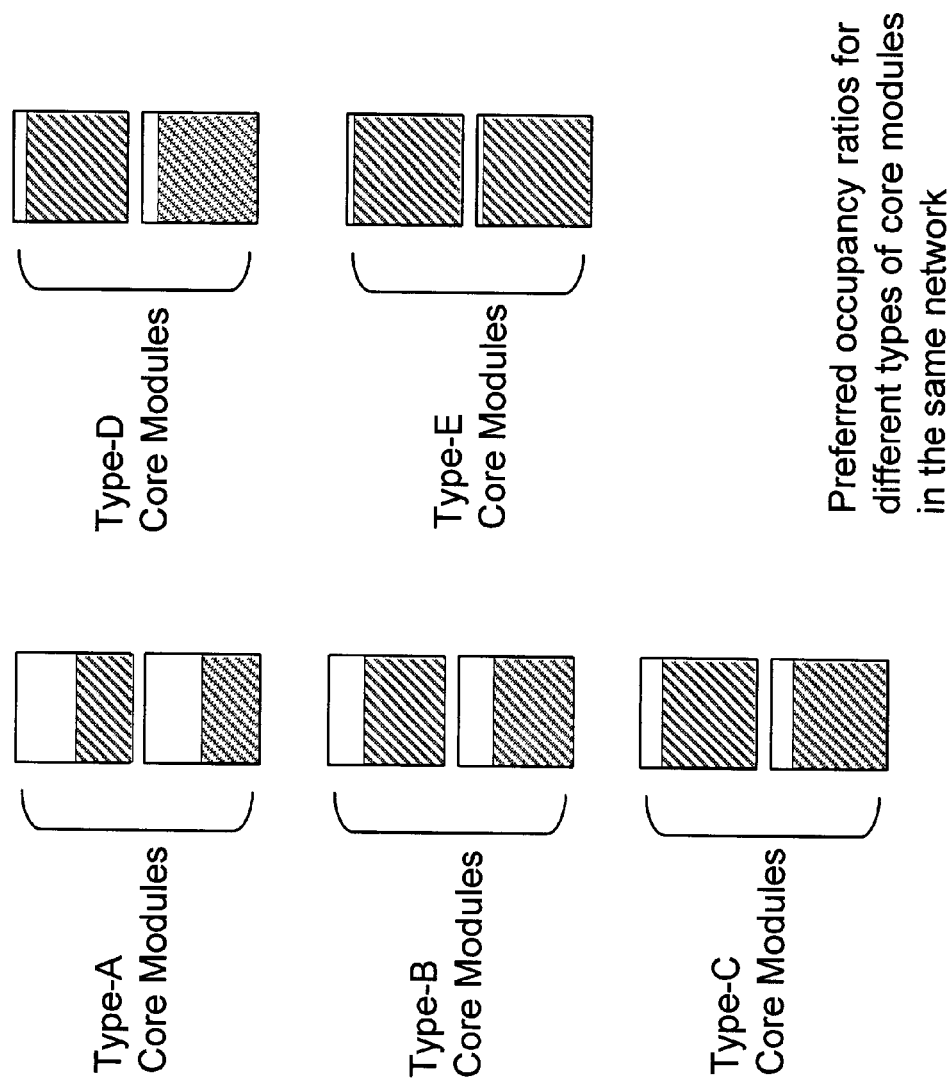
FIG. 9 is a schematic diagram illustrating preferred occupancy ratios for different types of core modules in a multi-grained data network in accordance with the invention.

FIG. 9 is a schematic diagram illustrating a preferred occupancy ratio for different types of core modules in the same network. The occupancy ratio is an indication of an average use of the capacity of paths supported by each type of core module. As is apparent from an inspection of the diagram, the connections that support coarse-grained paths are preferably most fully utilized, with a percentage of utilization gradually decreasing for each successive type of core module. The Type-E core modules 180 are preferably utilized at or near capacity whereas the Type-A core modules, which enable paths of fine granularity, are preferably reserved to accommodate rapid fluctuations in traffic patterns because they support connections of the finest granularity. The utilization patterns may be enforced by arranging forwarding tables in a specific order that promotes data traffic packing, as will be explained below with reference to FIGS. 10 and 11. As will be understood by those skilled in the art, the occupancy ratios shown in FIG. 9 for different types of core modules are for sake of example only, and other traffic distribution patterns may be used for routing data traffic through the multi-grained data network 100.

FIG. 10 shows an example of connectivity between an ingress module 200 having an output rotator 231 and egress modules 210 in a network 100. In this example, each of the egress ports 228 are respectively connected to core modules of Type-A, Type-B, Type-D and Type-E. The number of ports connected to the four types of core modules are equal. It should be noted that this equal partitioning of the ports is exemplary only. The respective output ports 227 of an ingress module 200 are connected via core modules (FIG. 2) to respective egress edge modules 210 indicated by egress module identification numbers 410. The identification numbers 410 indicate an egress edge module 210 currently connected to or, in the case of Type-A core modules, accessible by the ingress edge module 200. As seen in FIG. 10, output ports 227 numbered 1–4 are connected to Type-A core modules which provide switched connectivity to any one of edge modules 1–32. Links 250a are connected to Type-B core modules 150, which support switched channel connections. As seen in FIG. 10, the ingress module 200 is connected to egress modules 18, 3, 2 and 1 by links 250a. The links 270a are connected to Type-D core modules which support cross-connected channels. The links 270a are respectively connected to edge modules 16, 8, 4 and 3. Links 280a are connected to a Type-E core module 180 (FIG. 2). Due to the granularity of Type-E paths, ports 280a are all connected to edge module 2.

FIG. 11 shows a data structure that may be used for forwarding traffic from an ingress module 200 to a respective egress module 210 in a multi-grained data network 100. The data structure facilitates connection processing, and ensures connection packing, described above with reference to FIG. 9. In the data structure shown in FIG. 11, a forwarding vector 400 associates egress edge module identifiers 410 with pointers 420 to a forwarding table 430. The forwarding table 430 includes a forwarding table array 440 associated with each pointer 420. Each forwarding table array 440 includes a plurality of serially-arranged output port identifiers 445, which identify output ports of the ingress edge module 200. The output port identifiers 445 are preferably serially arranged in a predetermined order to ensure that connection packing is performed to achieve a core occupancy similar to the core occupancy ratios schematically illustrated in FIG. 9. The forwarding table 430 is dynamically updated as core modules are reconfigured and connectivity changes between the ingress edge module 200 and the egress edge modules 210 designated by egress module identifiers 410. When a connection request is received by an ingress edge module 200, the ingress edge module identifies the egress edge module 210 associated with the request and indexes the egress edge module identifiers 410 to retrieve the associated pointer 420. The associated pointer 420 is then used to locate a corresponding forwarding table array 440. The egress port identifiers 445 of each array are then used to sequentially query the vacancy of output ports 227 identified in the array, until free capacity adequate to service the request is located.

The output port identifiers 445 are preferably arranged in descending order of granularity to ensure that the coarsest paths between an ingress module 200 and an egress module 210 are used first. In certain instances, it may be desirable to restrict path selection based on predetermined criteria in addition to a simple serial search of output ports for free capacity adequate to serve a given connection. For example, it may be desirable to reserve a certain proportion of the capacity of paths having a very coarse granularity (such as paths supported by core modules of Type-C and Type-E) in order to ensure that a certain capacity is reserved for anticipated connections requiring large capacity. If so, if a traffic load associated with a connection request exceeds a certain threshold (100 Mb/s, for example) the connection is assigned to the first egress port 445 having free capacity. If, on the other hand, the connection request relates to a connection that requires a bit-rate allocation less than the first threshold, a current usage of the capacity of the path is preferably examined before the connection is allocated to the path. For example, if a connection request for a few Kb/s is received, the connection request is allocated to a path with large granularity only if the current occupancy of the path is less than a second threshold. The second threshold is preferably a decreasing function of a granularity of the path. For example, a path having a granularity of the entire WDM link may have a second threshold (occupancy threshold) of 80 percent to screen out small connection requests when the occupancy of the path exceeds 80 percent. If the path is less than 80 percent occupied, any connection is allocated to it, regardless of the size of the connection. The purpose of this restriction is to prohibit paths having a large granularity from becoming congested with small connections, while still ensuring packing so that paths having a large granularity are well utilized.

In accordance with one embodiment of the invention, Type-E paths have an occupancy threshold of 80 percent; Type-D paths have an occupancy threshold of 85 percent; Type-C paths have an occupancy threshold of 90 percent; Type-B paths have an occupancy threshold of 95 percent; and Type-A paths have an occupancy threshold of 100 percent. In other words, any connection may be assigned to a Type-A path, if capacity exists on the path and the connection cannot be assigned to a path having a coarser granularity.

Figure 12:
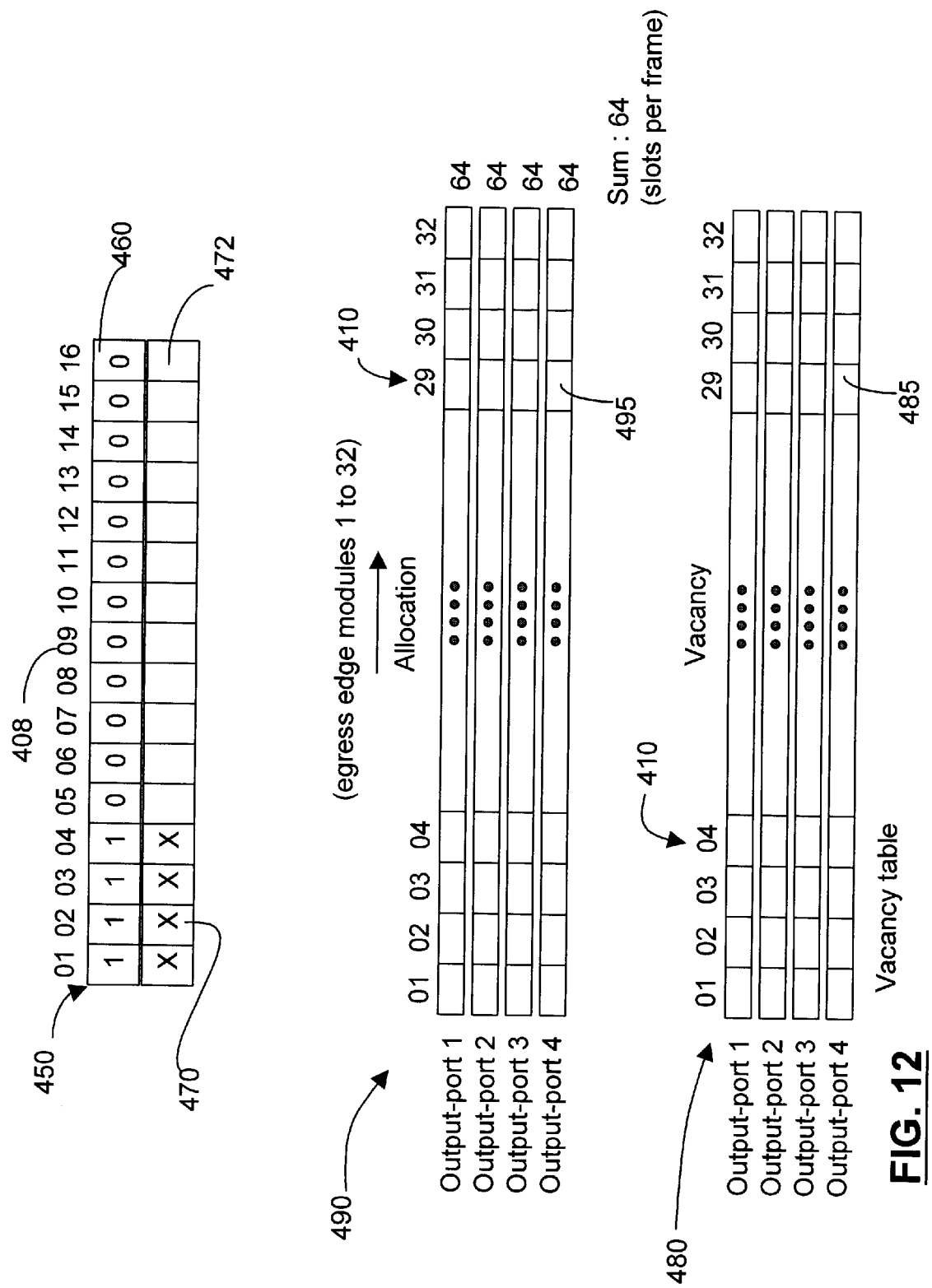
FIG. 12 schematically illustrates tables used by an ingress edge module in a multi-grained data network for determining which ports can be used to launch data traffic into the network for a given connection.

FIG. 12 is a schematic diagram of tables used by the controller 202A of an ingress edge module 200 (FIG. 3) for determining whether an output port 227 pointed to by forwarding table 430 (FIG. 11) can be used for establishing a connection to an egress edge module 210 (FIG. 2). As explained above, the forwarding table 430 (FIG. 11) provides a list of egress ports arranged in a preferred order. The list is used for establishing a connection to a given egress edge module 210 identified by an egress module identifier 410. Data structures schematically represented in FIG. 12 are useful for determining whether a port designated by the forwarding table 430 has available capacity to accept a connection. When an ingress edge module controller 202A retrieves an output port number from the forwarding table 430 shown in FIG. 11, the ingress edge module controller 202A first consults a port-type vector 450 (FIG. 12) which correlates a port number identifier 408 with a port-type 460, and one of a pointer 470 to vacancy table 480 or an occupancy indicator 472. For the sake of simplicity of illustration, the port-type vector shown in FIG. 12 is one used by an ingress edge module 200 having only sixteen output ports 227 identified by output port identifier numbers 01–16. Associated with each output port identifier is a port-type 460. In this example, output port-type is either "1" indicating that the output port supports a TDM/WDM link, or "0" indicating that the output port supports a link having a coarser granularity. If the output port-type is 1, an associated array stores a pointer 470 to a vacancy table 480 reserved exclusively for output ports that support switched data block connections on TDM/WDM links 240a. If the output port-type is 0, the associated array stores a current occupancy 472 of the link connected to the output port. Therefore, unless an output port of an ingress edge module 200 is a Type A port, availability of the port can be established with reference to only the port-type vector 450 because it indicates a current occupancy of an associated channel or link.

If, however, the output port-type indicated in the output port-type vector 450 is "1" as, in this example, ports 01–04, then pointer 470 to the vacancy table 480 is used to locate an appropriate row in the vacancy table. A row in the vacancy table 480 corresponds to a Type A path to an egress core module 210. The row in the vacancy table is divided into a number of columns equal to the number of egress edge modules 210 (FIG. 2) in the network 100. Each column is associated with an egress edge module identifier 410. Consequently, a very rapid search may be performed to determine whether vacancy exists for accommodating the connection. The vacancy is expressed as a number of free time slots. Each free time slot accommodates a maximum sized data block, for example, 4 kilo bits. Data traversing a Type-A path is arranged in time frames as described in Applicant's copending U.S. patent application Ser. No. 09/550,489 referenced above. Each frame from an output port 227 of egress edge module 200 accommodates a predetermined number of time slots. In the example shown in FIG. 12, the number of time slots per frame is 64.

As explained above, by consulting the vacancy table 480, the edge module controller 202A very rapidly determines whether sufficient capacity for a connection exists at a Type-A data port. The vacancy table 480 is associated with an allocation table 490 that is used to store the time slot allocations granted to a controller 202A of an ingress edge module 210. As explained above, core modules of Type-A, Type-B and Type-C are preferably adapted to reconfigure as required by fluctuations in network traffic. Consequently, the Type-A core modules 140 associated with Type-A ports may reconfigure to adapt to significant fluctuations in the network data traffic. When such reconfigurations occur, the allocations granted to an ingress edge module 200 for connectivity with egress edge modules 210 may change. The allocation table 490 is therefore used to store allocations, if any, associated with each egress edge module 200. The vacancy table 480 must be updated each time the allocation table 490 is modified. For example, if a reconfiguration of core modules of Type-A changes the time slot allocations granted to an ingress edge module 200, the changed allocations must be used to update allocation table 490, and any changed values must be reflected in the vacancy table 480 to ensure that allocated time slots are not over-subscribed or under-subscribed.

Figure 13:
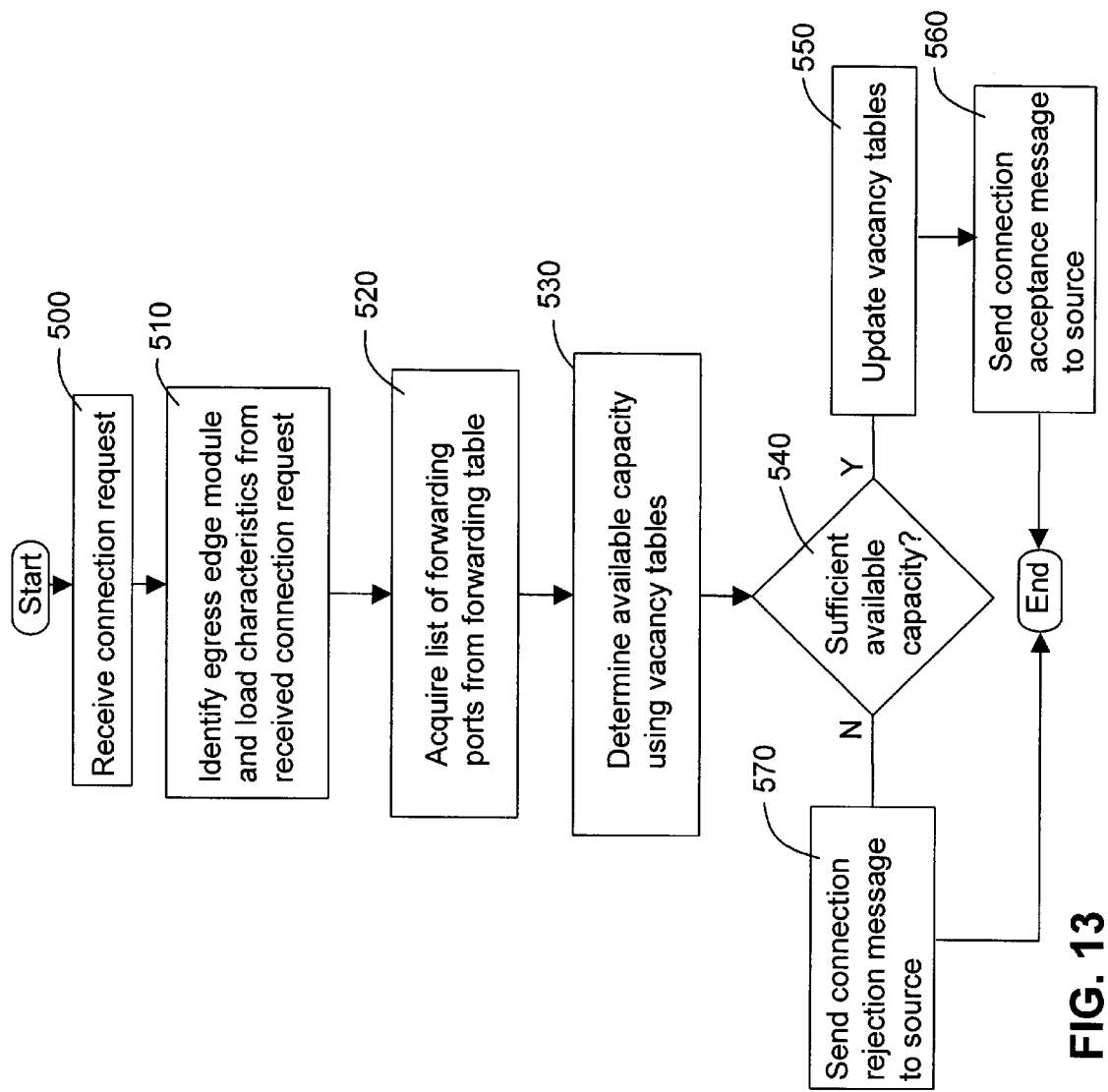
FIG. 13 is a flow chart illustrating the steps performed at an ingress edge module when a connection request is received from a subtending data traffic source.

FIG. 13 is a flow chart that shows the principal steps performed by the controller 202A of an ingress edge module 200 (FIG. 2) when a connection request is received from a subtending data source (not shown). In step 500, the controller 202 receives a connection request from a subtending data source. In step 510, the controller 202 translates the address of a data sink to which the connection request is directed to determine an egress edge module 210 that serves the data sink, using routing or translation tables well known in the art. If an egress edge module 210 is successfully identified, the load characteristics associated with the received connection request are examined to determine a capacity requirement for the request. As will be understood by those skilled in the art, capacity requirements are not always available in a connection request and other methods may be used to estimate the capacity required for the request. Alternatively, the request may be assigned to any connection having capacity assumed to be adequate, and the actual traffic load is measured later, after data traffic flow commences in order to determine the capacity consumed by the connection.

After examining load characteristics to determine the capacity required for the request, the controller 202 of the ingress edge module 200 examines (step 520) the tables shown in FIG. 11 to acquire a list of forwarding ports from the forwarding table 430. In step 530, the controller 202 uses the capacity vacancy tables 450 and 480 shown in FIG. 12 to determine available capacity, as described above. If the output port-type 460 is a port-type 0, as explained above, the port-type vector 450 includes an available capacity of the port in entry 472 (FIG. 12). Step 530 may also determine the availability based on the thresholds described above. In step 540, the controller 202 determines whether sufficient capacity is available to satisfy the request. If sufficient capacity is available on a path from the ingress module 200 to the egress module 210 that serves the data sink, the vacancy tables shown in FIG. 12 are appropriately updated (step 550). A connection acceptance message is then sent to the source in step 560, and the process ends. If it is determined in step 540, however, that sufficient capacity is not available to satisfy the request, a connection rejection message is sent to the source in step 570 and the process ends.

The invention therefore provides a flexible network which is adapted to be tailored to the specific requirements of each node pair in the network 100, using paths of a granularity that is appropriate for traffic volumes between respective edge modules. The ability to provision a network in this way reduces cost, and complexity of network control structures, while facilitating network engineering and management functions.

The embodiments of the invention described above are intended to be exemplary only. The scope of the invention is therefore intended to be limited solely by the scope of the appended claims.

We claim:

1. A multi-grained data network, comprising:
   a) a plurality of edge modules respectively connected to data sources and data sinks;
   b) a plurality of different types of core modules, each core module being adapted to enable paths between the plurality of edge modules, a granularity of each path being specific to the type of core module that enabled the path, and
   c) a plurality of data links interconnecting the edge modules and the core modules;
   wherein each of the types of core module comprises a plurality of core modules;
   and wherein one of the types of core modules is an optical cross-connector adapted to enable provisioned paths between edge modules, each path having a granularity of an entire optical fiber.

2. A multi-grained data network as claimed in claim 1 wherein one of the types of core modules is an optical cross-connector adapted to enable provisioned paths between edge modules, each path having a granularity of at least one channel of a wavelength division multiplexed (WDM) optical fiber.

3. A multi-grained data network as claimed in claim 1 wherein one of the types of core modules is an optical switch adapted to switch paths between edge modules, each path having a granularity of a wavelength division multiplexed (WDM) optical fiber.

4. A multi-grained data network comprising:
   a plurality of edge modules respectively connected to data sources and data sinks, wherein the edge modules are rotator-type electronic switches;
   a plurality of different types of core modules, each core module being adapted to enable paths between the plurality of edge modules, a granularity of each path being specific to the type of core module that enabled the path; and
   a plurality of data links interconnecting the edge modules and the core modules;
   wherein each of the types of core module comprises a plurality of core modules;
   and wherein one of the types of core modules is a switch adapted to switch paths between edge modules, each path having a granularity of a data block of a predetermined size.

5. A multi-grained data network as claimed in claim 4 wherein ingress ports of ingress edge modules include input buffers.

6. A multi-grained data network as claimed in claim 4 wherein certain of the output ports of ingress edge modules are connected to a wavelength division multiplexed/time division multiplexed (WDM/TDM) core module type.

7. A multi-grained data network as claimed in claim 6 wherein the output ports connected to the WDM/TDM core module type are respectively equipped with a time slot interchange circuit.

8. A method of allocating data traffic associated with a connection request to data transfer facilities in a multi-grained network, comprising steps of:
   d) examining the data traffic connection request to identify an egress edge module in the multi-grained network and a traffic load associated with the connection request;
   e) examining a list of forwarding ports associated with the egress edge module using a forwarding table and a vacancy table, the forwarding ports being examined in a predetermined order; and
   f) selecting a first forwarding port having capacity available to accommodate the request.

9. A method as claimed in claim 8 wherein the predetermined order is a descending order with respect to a granularity of a data transport facility associated with each forwarding port.

10. A method as claimed in claim 8 wherein the step of selecting the first forwarding port having capacity available to accommodate the request further comprises steps of:
    g) determining whether the traffic load of the connection exceeds a first threshold;
    h) if the traffic load exceeds the first threshold, allocating the connection to a first forwarding port having capacity available to accommodate the connection;
    i) if the traffic load is less than the first threshold, examining the occupancy of respective forwarding ports to determine whether an occupancy of the forwarding port exceeds a second threshold; and
    j) if the occupancy of a forwarding port is less than the second threshold, allocating the connection to the forwarding port if sufficient free capacity exists, and otherwise rejecting the connection request.

11. A method as claimed in claim 10 wherein the first threshold is 100 megabits per second.

12. A method as claimed in claim 10 wherein the second threshold is 80 percent for forwarding ports associated with provisioned optical fiber transfer facilities; 85 percent for forwarding ports associated with switched optical fiber facilities; 90 percent for forwarding ports associated with provisioned optical channel facilities; 95 percent for forwarding ports associated with switched optical channel facilities; and, 100 percent for forwarding ports associated with switched data block facilities.

13. A method as claimed in claim 10 further comprising a step of rejecting the connection request if the available capacity is less than the traffic load.

14. A method as claimed in claim 13 wherein, if the available capacity exceeds the traffic load, the method further comprises steps of:

k) accepting the connection request;

l) allocating data segments associated with the connection to the selected forwarding port; and m) updating the occupancy of the selected forwarding port.

15. A multi-grained data network comprising:

a plurality of edge modules respectively connected to data sources and data sinks;

a plurality of different types of core modules, each core module being adapted to enable paths between the plurality of edge modules, a plurality of each loath being specific to the type of core module that enabled the path; and a plurality of data links interconnecting the edge modules and the core modules;

wherein each of the types of core module comprises a plurality of core modules;

and wherein one of the types of core modules is a time division multiplexed/wavelength division multiplexed (TDM/WDM) switch adapted to switch paths between edge modules, each path having a granularity of a data block of a predetermined size.

16. A multi-grained data network comprising:

a plurality of edge modules respectively connected to data sources and data sinks, wherein each one of the edge modules is an electronic switch;

a plurality of different types of core modules, each core module being adapted to enable paths between the plurality of edge modules, a granularity of each path being specific to the type of core module that enabled the path; and a plurality of data links interconnecting the edge modules and the core modules;

wherein each of the types of core module comprises a plurality of core modules; and wherein one of the types of core modules is a switch adapted to switch paths between edge modules, each path having a granularity of a data block of a predetermined size.

* * * * *

UNITED STATES PATENT AND TRADEMARK OFFICE
CERTIFICATE OF CORRECTION

PATENT NO. : 6,882,799 B1
DATED : April 19, 2005
INVENTOR(S) : Beshai

It is certified that error appears in the above-identified patent and that said Letters Patent is hereby corrected as shown below:

Column 1,
Line 8, insert -- This invention was made with Government support under Technology Investment Agreement F30602-98-2-0194 awarded by the Air Force. The Government has certain rights in this invention. --.

Signed and Sealed this

Tenth Day of January, 2006

JON W. DUDAS
*Director of the United States Patent and Trademark Office*